(12) United States Patent  
Ruan et al.

(10) Patent No.: US 11,846,843 B2
(45) Date of Patent: Dec. 19, 2023

(54) DIMMING GLASS WINDOW AND VEHICLE (71) Applicants: Beijing BOE Optoelectronics Technology Co., Ltd., Beijing (CN); BOE Technology Group Co., Ltd., Beijing (CN)

(72) Inventors: Yiping Ruan, Beijing (CN); Zhonghua Li, Beijing (CN); Shipeng Wang, Beijing (CN); Dongjia Hao, Beijing (CN); Shaofei Guo, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/905,245

(22) PCT Filed: Oct. 11, 2021

(86) PCT No.: PCT/CN2021/123100
§ 371 (c)(1),
(2) Date: Aug. 29, 2022

(87) PCT Pub. No.: WO2022/111077
PCT Pub. Date: Jun. 2, 2022

(65) Prior Publication Data
US 2023/0109680 A1 Apr. 13, 2023

(30) Foreign Application Priority Data
Nov. 26, 2020 (CN) .......................... 202011343055.4

(51) Int. Cl.
*G02F 1/1333* (2006.01)
*B32B 7/12* (2006.01)
(Continued)

(52) U.S. Cl.
CPC ............ *G02F 1/13338* (2013.01); *B32B 7/12* (2013.01); *B32B 17/10045* (2013.01);
(Continued)

(58) Field of Classification Search
CPC .................................................. G02F 1/13338
See application file for complete search history.

(56) References Cited

U.S. PATENT DOCUMENTS

2018/0299708 A1 10/2018 Liang
2018/0314081 A1 11/2018 Hoggarth et al.
(Continued)

FOREIGN PATENT DOCUMENTS

CN 104950491 A 9/2015
CN 108790738 A 11/2018
(Continued)

OTHER PUBLICATIONS

International Search Report, dated Jan. 17, 2022, from PCT/CN2021/123100.
(Continued)

*Primary Examiner* — Edmond C Lau
(74) *Attorney, Agent, or Firm* — Workman Nydegger (57) ABSTRACT A dimming glass window and a vehicle. The dimming glass window includes: a glass unit including an inner glass assembly and an outer glass assembly which are oppositely arranged, an accommodation space is between the inner glass assembly and the outer glass assembly; a touch function layer and a dimming function layer arranged between the inner glass assembly and the outer glass assembly, the touch function layer is on an inner side of the dimming function layer; a control unit in the accommodating space and connected to the touch function layer and the dimming function layer; and a dimming controller arranged outside the glass unit, the dimming controller is connected to the
(Continued)

control unit by a wire so as to match the control unit, the touch function layer and the dimming function layer to implement light transmittance adjustment of the dimming glass window. The vehicle includes the dimming glass window.

20 Claims, 6 Drawing Sheets

(51) Int. Cl.
*B32B 17/10* (2006.01)
*B61D 25/00* (2006.01)
*G02F 1/137* (2006.01)

(52) U.S. Cl.
CPC .. *B32B 17/10293* (2013.01); *B32B 17/10513* (2013.01); *B32B 17/10761* (2013.01); *B61D 25/00* (2013.01); *G02F 1/137* (2013.01); *G02F 1/133302* (2021.01); *B32B 2605/006* (2013.01); *B32B 2605/10* (2013.01); *G02F 2202/043* (2013.01); *G02F 2202/28* (2013.01); *G02F 2203/48* (2013.01)

(56) References Cited

U.S. PATENT DOCUMENTS

| | | | |
|---|---|---|---|
| 2021/0206241 A1* | 7/2021 | Guo | G02F 1/172 |
| 2022/0410672 A1 | 12/2022 | Hu et al. | |
| 2023/0004030 A1* | 1/2023 | Ma | H02M 7/5387 |

FOREIGN PATENT DOCUMENTS

| | | |
|---|---|---|
| CN | 109683736 A | 4/2019 |
| CN | 110171274 A | 8/2019 |
| CN | 110626299 A | 12/2019 |
| CN | 110843830 A | 2/2020 |
| CN | 111086371 A | 5/2020 |
| CN | 111376684 A | 7/2020 |
| CN | 211001326 U | 7/2020 |
| CN | 111752414 A | 10/2020 |
| CN | 214330377 U | 10/2021 |
| KR | 101744316 B1 | 6/2017 |
| WO | 2016043164 A1 | 3/2016 |
| WO | 2019198748 A1 | 10/2019 |

OTHER PUBLICATIONS

Zhang et al., "Design of a Dimming Control System for Automotive Intelligent Front Windshield", Auto Engineer, May 2020, pp. 17-19.

* cited by examiner

DIMMING GLASS WINDOW AND VEHICLE

CROSS REFERENCE TO RELATED APPLICATIONS

The present application is a National Stage of International Application No. PCT/CN2021/123100, filed on Oct. 11, 2021, which claims priority to the Chinese Patent Application No. 202011343055.4, filed to China Patent Office on Nov. 26, 2020, and entitled "DIMMING GLASS WINDOW AND VEHICLE", the entire content of which is incorporated herein by reference.

FIELD

The present disclosure relates to the technical field of display, in particular to a dimming glass window and a vehicle.

BACKGROUND

In recent years, dimming vehicle windows have been more and more widely used in rail vehicles such as high-speed trains and maglev trains. Among them, gesture dimming vehicle windows and push-button dimming vehicle windows are the most widely used.

SUMMARY

A dimming glass window includes:
- a glass unit, including an inner glass assembly and an outer glass assembly which are oppositely arranged, wherein an accommodation space is defined between the inner glass assembly and the outer glass assembly;
- a touch function layer and a dimming function layer, wherein both of the touch function layer and the diming function layer are arranged between the inner glass assembly and the outer glass assembly, wherein the touch function layer is located on an inner side of the dimming function layer;
- a control unit located in the accommodating space and connected to the touch function layer and the dimming function layer; and
- a dimming controller arranged outside the glass unit, wherein the dimming controller is connected to the control unit by means of a wire, and the dimming controller cooperates with the control unit, the touch function layer and the dimming function layer to implement light transmittance adjustment of the dimming glass window.

Optionally, the control unit includes a touch control unit connected to the touch function layer and a dimming control unit connected to the dimming function layer, wherein both the touch control unit and the dimming control unit are connected to the dimming controller through wires.

Optionally, a silk screen region is arranged at an edge of the inner glass assembly, and orthographic projections of the touch control unit and the dimming control unit on the inner glass assembly are located in the silk screen region.

Optionally, the dimming glass window includes a light transmittance indicator light, and the light transmittance indicator light is connected to the dimming controller.

Optionally, the light transmittance indicator light is arranged on a layer same as a layer on which the touch function layer is.

Optionally, the dimming glass window includes a touch button for light transmittance adjustment and a touch button control unit connected to the touch button, and the touch button control unit is connected to the dimming controller.

Optionally, the touch button is arranged on a layer same as a layer on which the touch function layer is.

Optionally, the dimming glass window includes an inner frame and an outer frame, wherein the inner frame is sandwiched between the inner glass assembly and the outer glass assembly, and the outer frame coats an outer edge of the glass unit.

Optionally, the inner glass assembly includes a first glass plate and a second glass plate which are arranged in sequence from inside to outside, and the touch function layer is between the first glass plate and the second glass plate and is bonded to at least one of the first glass plate and the second glass plate.

Optionally, a reticulated adhesive layer is arranged between the first glass plate and the touch function layer, and the first glass plate is bonded to the touch function layer through the reticulated adhesive layer.

Optionally, the outer glass assembly includes a third glass plate and a fourth glass plate which are arranged in sequence from inside to outside, and dimming function layer is bonded to a face of the third glass plate facing away from the fourth glass plate.

The present disclosure further provides a vehicle, which is provided with any dimming glass window provided in the above technical solutions.

DETAILED DESCRIPTION OF THE EMBODIMENTS

The technical solutions of the embodiments of the present disclosure will be described clearly and completely below with reference to the accompanying drawings of the embodiments of the present disclosure. Apparently, the described embodiments are some, but not all, embodiments of the present disclosure. Based on the embodiments of the present disclosure, all other embodiments obtained by those ordinarily skilled in the art without creative work fall within the protection scope of the present disclosure.

In an existing dimming vehicle window, a control module of a function layer is arranged outside window glass, and an FPC connecting the function layer and the control module is located outside the vehicle window as well, so in a vehicle window installation process and the like, the FPC connecting the function layer and the control module is prone to being damaged by the outside. In order to solve the problem, the embodiment provides an improved dimming glass window.

Figure 1:
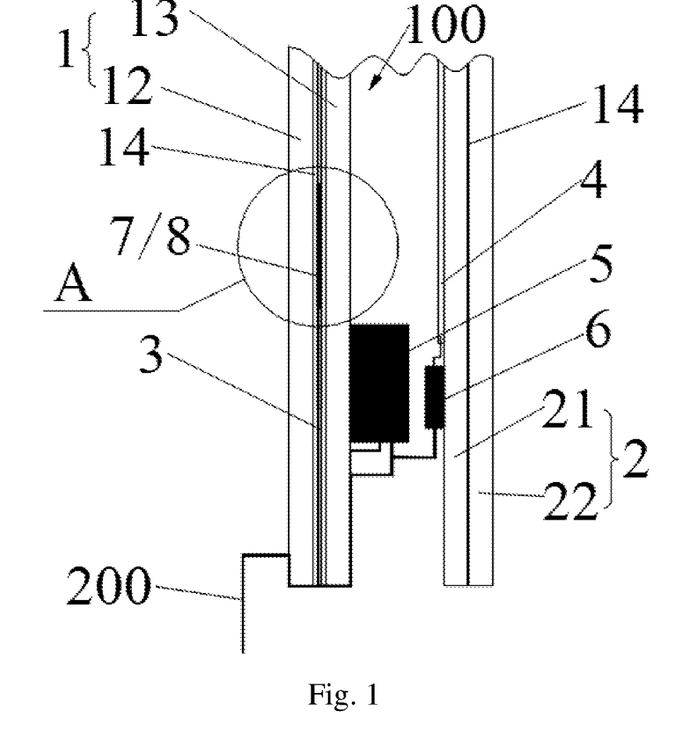
FIG. 1 is a schematic structural diagram of a dimming glass window provided by an embodiment of the present disclosure.

As shown in FIG. 1, a dimming glass window provided by the embodiment includes:

a glass unit, including an inner glass assembly 1 and an outer glass assembly 2 which are oppositely arranged, wherein an accommodation space 100 is defined between the inner glass assembly 1 and the outer glass assembly 2, and a distance between the inner glass assembly 1 and the outer glass assembly 2 is about 16 mm in general;

a touch function layer 3 and a dimming function layer 4, wherein the touch function layer 3 and the dimming function layer 4 are arranged between the inner glass assembly 1 and the outer glass assembly 2, wherein the touch function layer 3 is located on an inner side of the dimming function layer 4;

a control unit located in the accommodating space 100 and connected to the touch function layer 3 and the dimming function layer 4; and a dimming controller 400 arranged outside the glass unit, wherein the dimming controller 400 is connected to the control unit by means of a wire 200 (for example, an RS232 interface cable), the dimming controller 400 cooperates with the control unit, the touch function layer 3 and the dimming function layer 4 to implement light transmittance adjustment of the dimming glass window.

According to the dimming glass window provided by the present disclosure, the touch function layer 3 and dimming function layer 4 are located between the inner glass assembly 1 and the outer glass assembly 2, and the control unit connected to the touch function layer 3 and the dimming function layer 4 is located in the accommodation space 100 formed between the inner glass assembly 1 and the outer glass assembly 2, so that FPCs of the function layers connected to the control unit are located between the inner glass assembly 1 and the outer glass assembly 2, and the situation that the FPCs of the function layers connected to the control unit are damaged by the outside in an installation process and a subsequent maintenance process of the dimming glass window can be avoided.

Further referring to FIG. 1, when the above inner glass assembly 1 is specifically arranged, the inner glass assembly 1 may include a first glass plate 12 and a second glass plate 13 which are arranged in sequence from inside to outside; and in order to improve stability of the touch function layer 3, the touch function layer 3 may be arranged between the first glass plate 12 and the second glass plate 13, and the touch function layer 3 may be bonded to at least one of the first glass plate 12 or the second glass plate 13. For example, a reticulated adhesive layer 14 is arranged between the first glass plate 12 and the touch function layer 3, and the first glass plate 12 is bonded to the touch function layer 3 through the reticulated adhesive layer 14. In some embodiments, the reticulated adhesive layer 14 may be a PVB (Polyvinyl Butyral) adhesive layer.

The first glass plate 12 is bonded to the touch function layer 3 through the reticulated adhesive layer 14, and in a bonding process, the reticulated adhesive layer 14 may automatically exhaust bubbles, so that a bubble problem in a dimming region in the bonding process of the touch function layer 3 and the first glass plate 12 can be solved, and thus the possibility of glue failure between the first glass plate 12 and the touch function layer 3 is lowered.

A process of combining the first glass plate 12 and the reticulated adhesive layer 14 may be as follows:

Step S1, the first glass plate 12, the reticulated adhesive layer 14 and the touch function layer 3 are pre-bonded together; and Step S2, a structure formed through pre-bonding in step S1 is put into a 140° C.-heating kettle to be heated.

After heating, the reticulated adhesive layer 14 is melted and fills a seam; and after cooling, the first glass plate and the touch function layer 3 are bonded together.

Further referring to FIG. 1, when the above outer glass assembly 2 is specifically arranged, the outer glass assembly 2 may include a third glass plate 21 and a fourth glass plate 22 which are arranged in sequence from inside to outside. To facilitate the arrangement and facilitate connection with the control unit, the dimming function layer 4 may be bonded to a face of the third glass plate 21 facing away from the fourth glass plate 22. Optionally, the dimming function layer 4 may be bonded to the third glass plate 21 via a reticulated adhesive layer 14 (for example, PVB adhesive).

A thickness of each of the two layers of glass plates of the inner glass assembly 1 may be 4 mm, and a thickness of each of the two layers of glass plates of the outer glass assembly 2 may be 6 mm. Usually a plurality of reticulated adhesive layers 14 may be arranged between two bonded glass plates, a thickness of a single reticulated adhesive layer 14 is generally about 0.38 mm or 0.76 mm, and by thickness, a plurality of reticulated adhesive layers 14 may be arranged, for example, three reticulated adhesive layers may be arranged.

Of course, the quantity of glass plates in the inner glass assembly 1 and the outer glass assembly 2 may be more than 2, and for a specific structure, reference may be made to the prior art, which will not be repeated here.

Figure 2:
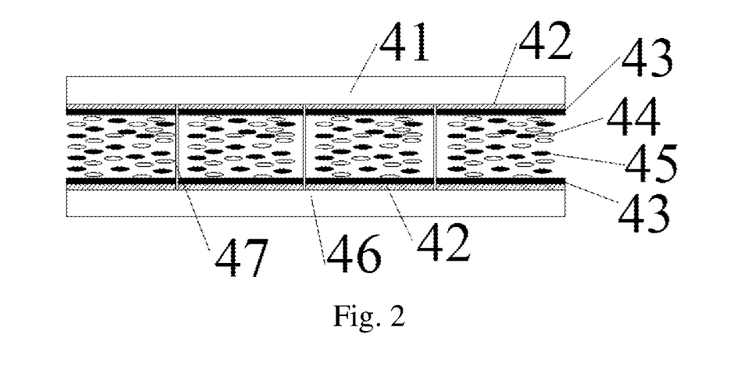
FIG. 2 is a schematic diagram of a dimming function layer in a dimming glass window provided by an embodiment of the present disclosure.
Figure 3:
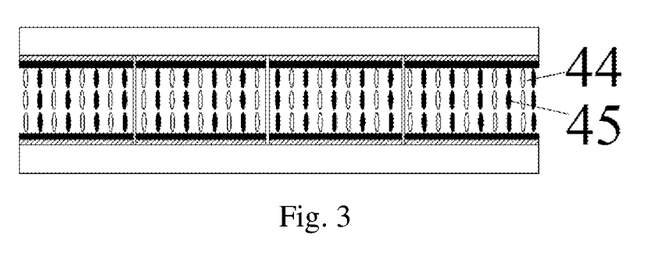
FIG. 3 is another schematic diagram of a dimming function layer in a dimming glass window provided by an embodiment of the present disclosure.

As shown in FIG. 2 and FIG. 3, when the above dimming function layer 4 is arranged, the dimming function layer 4 may include a first substrate 41 and a second substrate 46 which are oppositely arranged, and a filler between the first substrate 41 and the second substrate 46. The first substrate 41 and the second substrate 46 are generally made of glass, and thicknesses of the first substrate 41 and the second substrate 46 are usually 0.5 mm or 0.7 mm. Of course, the first substrate 41 and the second substrate 46 may also be films made of PET (polyethylene terephthalate) base materials.

The filler includes a mixture of liquid crystal molecules 44 and dichroic dye molecules 45 as well as a spacer 47, and a thickness of the filler is generally 9 μm.

A conductive layer 42 and an alignment layer 43 are arranged in sequence on the first substrate 41 in a direction where the first substrate 41 points towards the second substrate 46, and a conductive layer 42 and an alignment layer 43 are arranged in sequence on the second substrate 46 in a direction where the second substrate 46 points towards the first substrate 41. When electrodes on the conductive layers 42 are not loaded with a voltage, the liquid crystal molecules 44 and the dichroic dye molecules 45 are in a disorder random state, and at the moment, the dimming function layer 4 is in a dark state (as shown in FIG. 2). When the electrodes on the conductive layers 42 are loaded with the voltage, the liquid crystal molecules 44 and the dichroic dye molecules 45 are perpendicular to the substrates, and at the moment, the dimming function layer 4 is in a transparent state (as shown in FIG. 3). When the electrodes on the conductive layers 42 are loaded with different voltages, and different angles are formed between the liquid crystal molecules 44 and the dichroic dye molecules and the substrates, light transmittances of the dimming function layer 4 are different. The dimming function layer 4 may include a plurality of states with different light transmittances between the transparent state and the dark state, for example, a state with 5 light transmittance levels.

The touch function layer 3 communicates with the dimming function layer 4 through the dimming controller 400 and the wire 200, and gesture dimming (i.e. adjusting the light transmittance) may be realized by directly swiping fingers on a surface of the dimming glass window, thus facilitating operation by a user (for example, a train attendant or a passenger). Gestures may be divided into 8 types, for example, rightward swipe, leftward swipe, upward swipe, downward swipe, upper rightward swipe, lower rightward swipe, upper leftward swipe, and lower leftward swipe. Through gesture dimming, the light transmittance of the dimming function layer 4 may be adjusted as needed. According to directions of the gestures, the light transmittance of the dimming function layer 4 may be adjusted from large to small, or may be adjusted from small to large. In order to facilitate the adjustment of the light transmittance, the light transmittance of the dimming functional layer 4 is divided into five levels from the transparent state to the dark state after the dimming functional layer 4 is combined into a vehicle window. The light transmittance of the transparent state is higher than 40%, and the light transmittance of the dark state is lower than 1%. The light transmittance of the dimming glass window may be generally adjusted between 1% and 40% of the light transmittance. During gesture dimming, the light transmittance may be adjusted step by step, and it can be observed correspondingly that brightness of a view outside the vehicle window is changed step by step.

Figure 4:
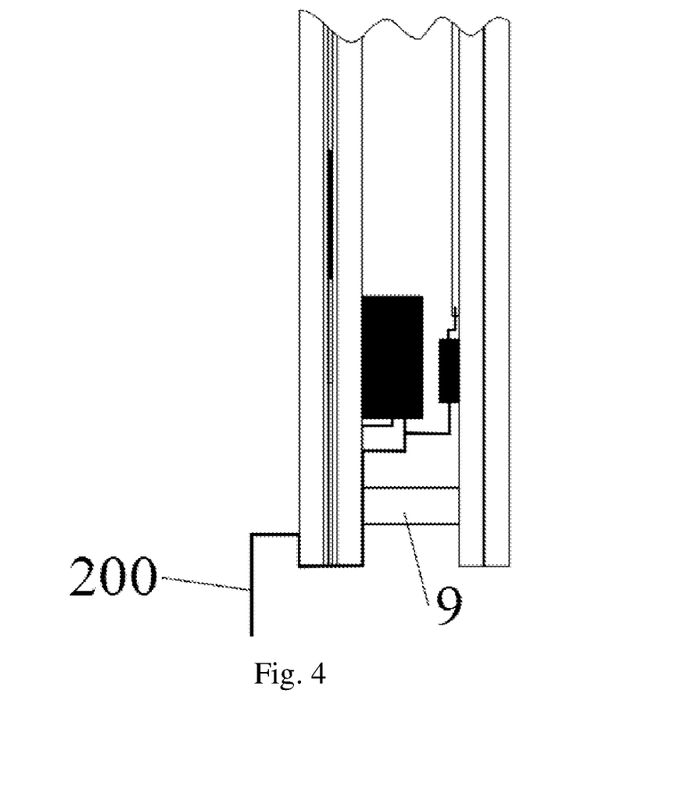
FIG. 4 is a schematic structural diagram of another dimming glass window provided by an embodiment of the present disclosure.
Figure 5:
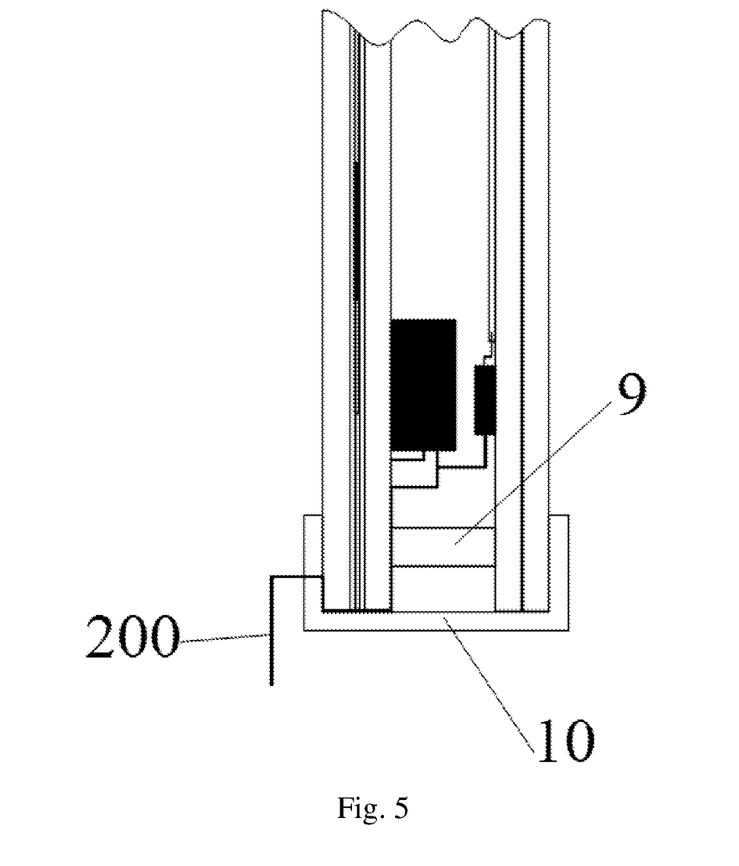
FIG. 5 is a schematic structural diagram of yet another dimming glass window provided by an embodiment of the present disclosure.

In order to ensure structural stability of the dimming glass window, realize better waterproof, dustproof and anti-electromagnetic radiation effects, and lower a risk of interference with a dimming function, as shown in FIG. 4 and FIG. 5, in one specific implementation, the dimming glass window may include an inner frame 9 sandwiched between the inner glass assembly 1 and the outer glass assembly 2 as well as an outer frame 10 coating an outer edge of the glass unit. In some embodiments, in order to reduce weight while ensuring strength, the inner frame 9 and the outer frame 10 may both be aluminum frames.

Further, the accommodation space 100 between the inner glass assembly 1 and the outer glass assembly 2 is filled with argon to achieve soundproof and heat insulation effects.

In an optional technical solution, the control unit includes a touch control unit 5 connected to the touch function layer 3 and a dimming control unit 6 connected to the dimming function layer 4. Both the touch control unit 5 and the dimming control unit 6 are connected to the dimming controller 400 through wires 200.

The touch control unit 5 and the dimming control unit 6 are separately arranged, so a thickness of the control unit can be reduced, which can not only facilitate the arrangement of the touch control unit 5 and the dimming control unit 6 in the accommodation space 100 between the inner glass assembly 1 and the outer glass assembly 2, but also has smaller influence on the thickness of the dimming glass window.

Figure 6:
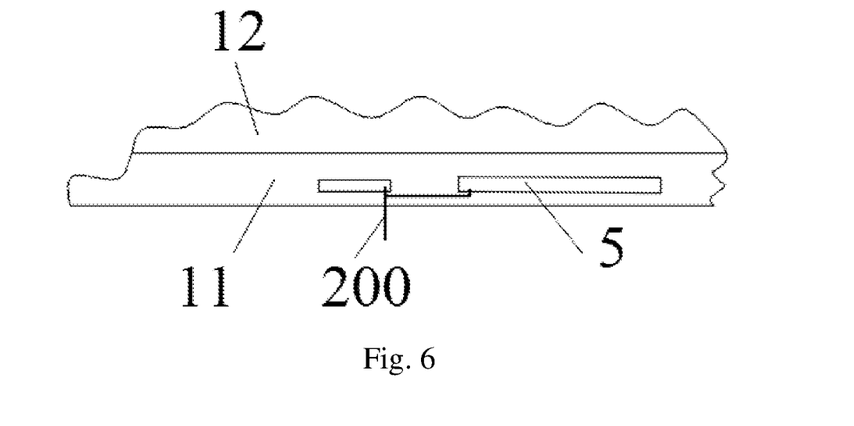
FIG. 6 is a schematic structural diagram of a local part of a dimming glass window provided by an embodiment of the present disclosure.

As shown in FIG. 6, in an optional technical solution, a silk screen region 11 is arranged at an edge of the inner glass assembly 1, and orthographic projections of the touch control unit 5 and the dimming control unit 6 on the inner glass assembly 1 are located in the silk screen region 11, so that the silk screen region 11 can block the touch control unit 5 and the dimming control unit 6, thus improving using experience of the user.

Figure 7:
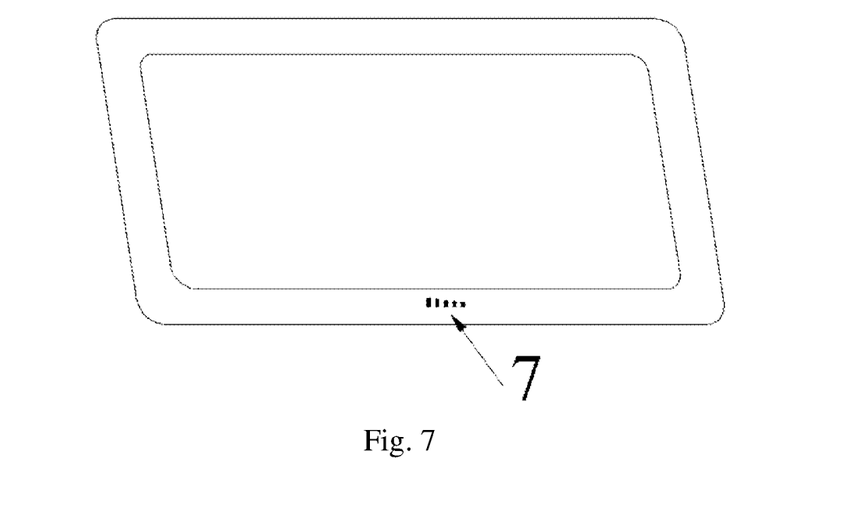
FIG. 7 is a schematic structural diagram of yet another dimming glass window provided by an embodiment of the present disclosure.

As shown in FIG. 7, in an optional technical solution, the dimming glass window includes a light transmittance indicator light 7, and the light transmittance indicator light 7 is connected to the dimming controller 400 to display the light transmittance of the dimming glass window, which facilitates the user's understanding of a current light transmittance level of the dimming glass window.

When the above light transmittance indicator light 7 is specifically arranged, the light transmittance indicator light 7 may include an ultra-thin mini LED backlight source (a thickness of the mini LED backlight source is usually about 0.35 mm), and include a plurality of display regions whose lengths increase sequentially. The plurality of display regions whose lengths increases sequentially respectively correspond to the light transmittance levels of the dimming glass window. As shown in FIG. 7, corresponding to the light transmittance levels of the dimming glass window, the light transmittance indicator light 7 includes 5 display regions whose lengths increase sequentially from right to left. When the first display region on the right is on, the corresponding light transmittance of the dimming glass window is the lowest; when two display regions on the right are on at the same time, the corresponding light transmittance of the dimming glass window is higher than the corresponding light transmittance of the dimming glass window when only the first display region on the right is on; and so on.

Of course, in other implementations, the light transmittance indicator light 7 may also display the light transmittance of the dimming glass window through other manners, for example, progress bar display and the like.

Figure 8:
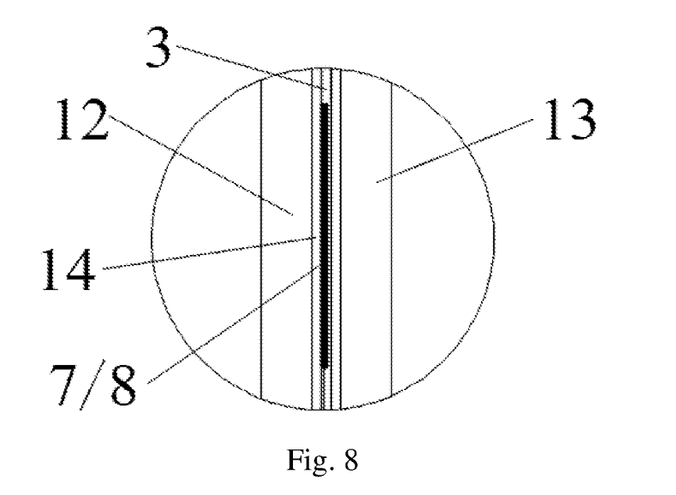
FIG. 8 is an enlarged diagram of a position A in FIG. 1.

In order to lower a thickness of the dimming glass window, as shown in FIG. 8, in a specific implementation, the light transmittance indicator light 7 is arranged on a layer same as a layer on which the touch function layer 3 is.

Figure 9:
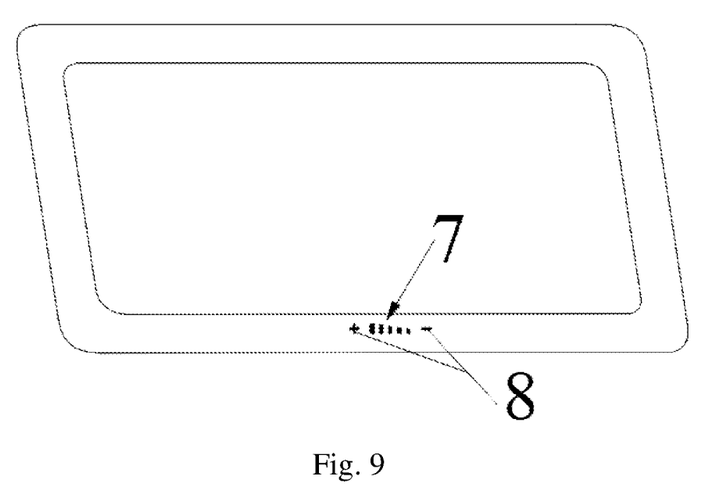
FIG. 9 is a schematic structural diagram of yet another dimming glass window provided by an embodiment of the present disclosure.

In order to achieve more diversified dimming manners of the dimming glass window so as to meet needs of different users, as shown in FIG. 9, in an optional implementation, the dimming glass window further includes a touch button 8 for light transmittance adjustment and a touch button 8 control unit connected to the touch button 8, and the touch button 8 control unit is connected to the dimming controller 400 to realize light transmittance adjustment of the dimming glass window.

In order to lower the thickness of the dimming glass window, in a specific implementation, the touch button 8 is arranged on a layer same as the layer on which the touch function layer 3 is.

Optionally, a protective layer of the touch function layer 3 is hollowed out at locations of the touch button 8 and the light transmittance indicator light 7, that is, the touch button 8 and the light transmittance indicator light 7 are arranged at the hollowed-out locations of the touch function layer 3. The touch button 8 and the light transmittance indicator light 7 are bonded to the first glass plate 12 through reticulated adhesive layers 14.

The control unit of the touch button 8 and the control unit of the light transmittance indicator light 7 may be integrated into a button and indicator light control unit 300. The button and indicator light control unit 300 and the touch control unit 5 may both be attached to a face of the second glass plate 13 facing away from the first glass plate 12. At the same time, orthographic projections of the control unit formed after integration of the control unit of the touch button 8 and the control unit of the light transmittance indicator light 7 as well as the touch control unit 5 on the first glass plate 12 are both located in the silk screen region 11, and are connected with the dimming controller 400 through RS232 interface cables.

Figure 10:
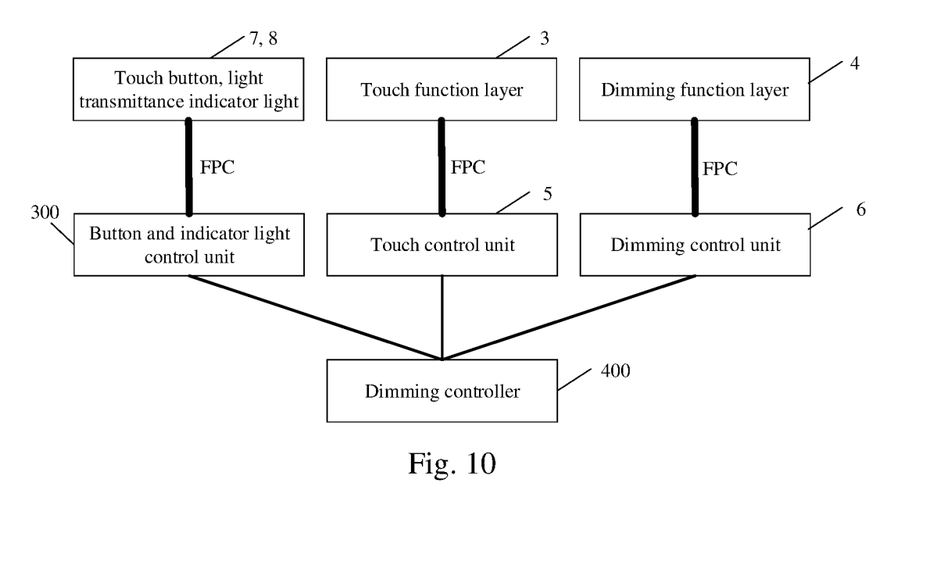
FIG. 10 is a schematic diagram of a connection relation of a control system of a dimming glass window provided by an embodiment of the present disclosure.

FIG. 10 shows a schematic diagram of a connection relation of a control system of a dimming glass window provided by an embodiment.

A vehicle provided by the embodiment is provided with the dimming glass window described above.

The vehicle provided by the embodiment is provided with the above dimming glass window, so the vehicle can at lease achieve technical effects that can be achieved by the above dimming glass window. That is, the touch function layer 3 and dimming function layer 4 are located between the inner glass assembly 1 and the outer glass assembly 2, and the control unit connected to the touch function layer 3 and the dimming function layer 4 is located in the accommodation space 100 formed between the inner glass assembly 1 and the outer glass assembly 2, so that the FPCs of the function layers connected to the control unit are located between the inner glass assembly 1 and the outer glass assembly 2, and the situation that the FPCs of the function layers connected to the control unit are damaged by the outside in an installation process of the vehicle window can be avoided.

Of course, the dimming glass window provided by the embodiment may also be applied to other scenes, for example, a window of a building and the like.

Obviously, those skilled in the art can make various modifications and transformations to the present disclosure without departing from the spirit and scope of the present disclosure. As such, provided that these modifications and transformations of the present disclosure fall within the scope of the claims of the present disclosure and their equivalents, the present disclosure is also intended to cover such modifications and transformations.

What is claimed is:

1. A dimming glass window, comprising:
   a glass unit, comprising an inner glass assembly and an outer glass assembly which are oppositely arranged, wherein an accommodation space is defined between the inner glass assembly and the outer glass assembly;
   a touch function layer and a dimming function layer, wherein both of the touch function layer and the diming function layer are arranged between the inner glass assembly and the outer glass assembly, wherein the touch function layer is on an inner side of the dimming function layer;
   a control unit located in the accommodating space and connected to the touch function layer and the dimming function layer; and
   a dimming controller arranged outside the glass unit, wherein the dimming controller is connected to the control unit by means of a wire, and the dimming controller cooperates with the control unit, the touch function layer and the dimming function layer to implement light transmittance adjustment of the dimming glass window.

2. The dimming glass window according to claim 1, wherein the control unit comprises a touch control unit connected to the touch function layer and a dimming control unit connected to the dimming function layer, wherein both the touch control unit and the dimming control unit are connected to the dimming controller through wires.

3. The dimming glass window according to claim 2, wherein a silk screen region is arranged at an edge of the inner glass assembly, and orthographic projections of the touch control unit and the dimming control unit on the inner glass assembly are located in the silk screen region.

4. The dimming glass window according to claim 1, further comprising a light transmittance indicator light, wherein the light transmittance indicator light is connected to the dimming controller.

5. The dimming glass window according to claim 4, wherein the light transmittance indicator light is arranged on a layer same as a layer on which the touch function layer is.

6. The dimming glass window according to claim 1, further comprising a touch button for light transmittance adjustment and a touch button control unit connected to the touch button, wherein the touch button control unit is connected to the dimming controller.

7. The dimming glass window according to claim 6, wherein the touch button is arranged on a layer same as a layer on which the touch function layer is.

8. The dimming glass window according to claim 1, further comprising an inner frame and an outer frame, wherein the inner frame is sandwiched between the inner glass assembly and the outer glass assembly, and the outer frame coats an outer edge of the glass unit.

9. The dimming glass window according to claim 1, wherein the inner glass assembly comprises a first glass plate and a second glass plate which are arranged in sequence from inside to outside, and the touch function layer is between the first glass plate and the second glass plate and is bonded to at least one of the first glass plate and the second glass plate.

10. The dimming glass window according to claim 9, wherein a reticulated adhesive layer is arranged between the first glass plate and the touch function layer, and the first glass plate is bonded to the touch function layer through the reticulated adhesive layer.

11. The dimming glass window according to claim 1, wherein the outer glass assembly comprises a third glass plate and a fourth glass plate which are arranged in sequence from inside to outside, and the dimming function layer is bonded to a face facing away from the fourth glass plate, of the third glass plate.

12. A vehicle, comprising a dimming glass window; wherein the dimming glass window comprises:
   a glass unit, comprising an inner glass assembly and an outer glass assembly which are oppositely arranged, wherein an accommodation space is defined between the inner glass assembly and the outer glass assembly;
   a touch function layer and a dimming function layer, wherein both of the touch function layer and the diming function layer are arranged between the inner glass assembly and the outer glass assembly, wherein the touch function layer is on an inner side of the dimming function layer;
   a control unit located in the accommodating space and connected to the touch function layer and the dimming function layer; and a dimming controller arranged outside the glass unit, wherein the dimming controller is connected to the control unit by means of a wire, and the dimming controller cooperates with the control unit, the touch function layer and the dimming function layer to implement light transmittance adjustment of the dimming glass window.

13. The vehicle according to claim 12, wherein the control unit comprises a touch control unit connected to the touch function layer and a dimming control unit connected to the dimming function layer, wherein both the touch control unit and the dimming control unit are connected to the dimming controller through wires.

14. The vehicle according to claim 13, wherein a silk screen region is arranged at an edge of the inner glass assembly, and orthographic projections of the touch control unit and the dimming control unit on the inner glass assembly are located in the silk screen region.

15. The vehicle according to claim 12, wherein the dimming glass window further comprises a light transmittance indicator light, wherein the light transmittance indicator light is connected to the dimming controller.

16. The vehicle according to claim 15, wherein the light transmittance indicator light is arranged on a layer same as a layer on which the touch function layer is.

17. The vehicle according to claim 12, wherein the dimming glass window further comprises a touch button for light transmittance adjustment and a touch button control unit connected to the touch button, wherein the touch button control unit is connected to the dimming controller.

18. The vehicle according to claim 17, wherein the touch button is arranged on a layer same as a layer on which the touch function layer is.

19. The vehicle according to claim 12, wherein the dimming glass window further comprises an inner frame and an outer frame, wherein the inner frame is sandwiched between the inner glass assembly and the outer glass assembly, and the outer frame coats an outer edge of the glass unit.

20. The vehicle according to claim 12, wherein the inner glass assembly comprises a first glass plate and a second glass plate which are arranged in sequence from inside to outside, and the touch function layer is between the first glass plate and the second glass plate and is bonded to at least one of the first glass plate and the second glass plate.

* * * * *